United States Patent [19]

Watson, Jr.

[11] 4,079,879
[45] Mar. 21, 1978

[54] MEANS FOR SOLDERING ALUMINUM JOINTS

[75] Inventor: James J. Watson, Jr., McMinnville, Tenn.

[73] Assignee: Carrier Corporation, Syracuse, N.Y.

[21] Appl. No.: 727,308

[22] Filed: Sep. 27, 1976

[51] Int. Cl.² .............................................. B23K 1/08
[52] U.S. Cl. ........................................ 228/1 A; 228/9; 228/56; 228/232; 228/183
[58] Field of Search ....................... 228/1 A, 9, 20, 40, 228/56, 57, 183, 232; 118/64; 427/378

[56] References Cited

U.S. PATENT DOCUMENTS

| | | | |
|---|---|---|---|
| 3,200,788 | 8/1965 | Tardoskegyi | 228/40 X |
| 3,760,481 | 9/1973 | Greever | 228/183 X |
| 3,769,675 | 11/1973 | Chartet | 228/183 X |
| 3,920,176 | 11/1975 | Becker et al. | 228/183 |

Primary Examiner—Donald G. Kelly
Assistant Examiner—K. J. Ramsey
Attorney, Agent, or Firm—J. Raymond Curtin; Robert P. Hayter

[57] ABSTRACT

Apparatus for bonding the tubular joints of a heat exchanger using an ultrasonic soldering process in which the heat exchanger structure is heated while the joints thereof are immersed within a molten solder bath thereby preventing excessive amounts of heat from being drawn out of the joint region during the bonding process.

4 Claims, 2 Drawing Figures

U.S. Patent     March 21, 1978     4,079,879

# MEANS FOR SOLDERING ALUMINUM JOINTS

BACKGROUND OF THE INVENTION

This invention relates to apparatus for forming a reliable metal joint and, in particular, to apparatus for soldering aluminum connections to aluminum heat exchanger tubes so as to establish a highly reliable bond there between.

In condensers and evaporators as typically employed in the air conditioning art, the joints between the tubular components of the heat exchanger must provide a reliable high strength seal to assure the fluid tight integrity of the unit. The forming of these joints, particularly where the tubular components are made of aluminum, presents a number of problems. Some of these problems are overcome by the ultrasonic dip soldering process wherein the joints are submerged within a bath of molten solder and the bath then treated with ultrasonic energy. The ultrasonic energy functions to remove oxide coatings from the aluminum components and thus permit solder to wet the metal surfaces whereby a good metallurgical bond is formed.

The untrasonic dip process has achieved a certain degree of success, however, it has been found that the heat exchanger structure which is specifically designed as a highly efficient heat transfer device, has the ability to drawn an inordinate amount of heat out of the joint region during the soldering process. To overcome this unwanted drain of energy, the heat exchanger structure is normally preheated to a temperature slightly above the soldering temperature prior to the joints being immersed in the molten bath. The preheated unit, however, must be handled and transported some distance prior to the joints being submerged in the bath. As a result, it is extremely difficult to maintain the exchanger structure at a constant predetermined temperature level.

SUMMARY OF THE INVENTION

It is therefore an object of the present invention to improve ultrasonic dip soldering of aluminum joints.

It is the further object of the present invention to accurately control the heating of a heat exchanger during an ultrasonic dip soldering process in order to formulate reliable high strength joints.

These and other objects of the present invention are attained by means of apparatus for ultrasonically soldering the joints of a fan coil heat exchanger including a liquid tight container supporting a bath of molten solder therein, transducer means associated with the container for producing ultrasonic waves within the bath, a housing positioned directly above the bath being arranged to substantially enclose a portion of the heat exchanger adjacent to the joint region when the joints of the exchanger are immersed in the bath, and means to move a flow of heated air over the portion of the heat exchanger enclosed within the housing to maintain at least a portion of the heat exchanger structure adjacent to the joint region at a predetermined temperature while the joints are being treated in the ultrasonic bath.

BRIEF DESCRIPTION OF THE DRAWINGS

For a better understanding of the present invention as well as other objects and further features thereof, reference is had to the following detailed description of the invention to be read in connection with the accompanying drawings, wherein.

DESCRIPTION OF THE PREFERRED EMBODIMENT

Figure 1:
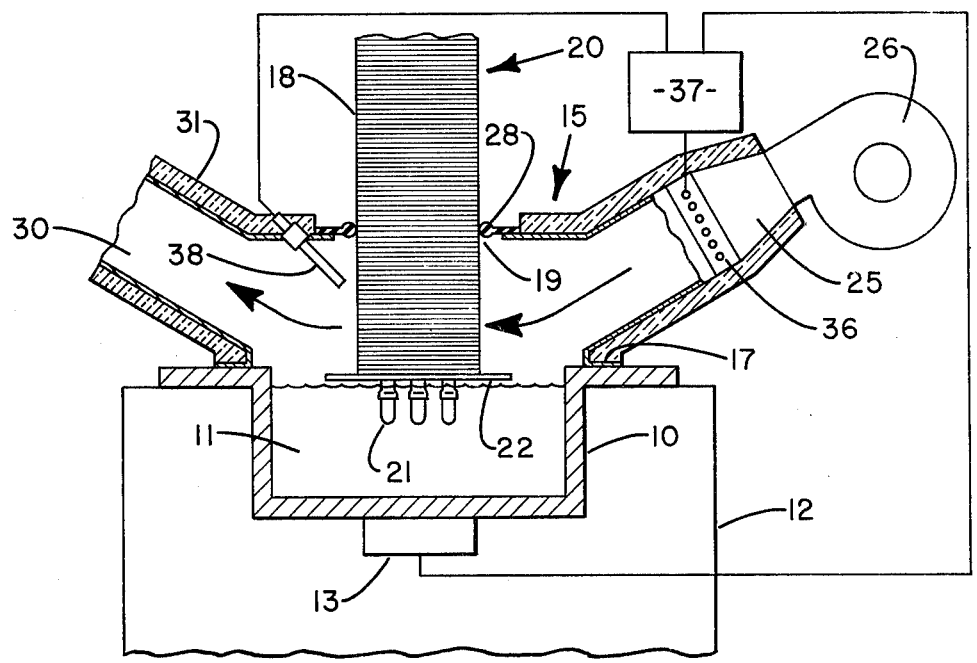
FIG. 1 is a diagrammatic illustration of a first embodiment of the present invention.

Referring initially to FIG. 1, there is shown apparatus for efficiently soldering the tubular joints of a heat exchanger employing an ultrasonic soldering process. The apparatus includes a solder pot 10 which is supported upon a work table 12. A bath 11 of solder is maintained in a molten state, and at a pre-determined temperature, within the pot. A series of transducer elements 13, affixed to the bottom wall of the pot, are provided to create ultrasonic vibrations within the molten liquid bath.

A housing, generally referenced 15, is supported by means of a flange 17 upon the upper surface of the work table so that the solder bath is exposed to the interior of the housing. A rectangular opening, 19 is provided in the top wall of the housing directly over the bath. The dimensions of the opening are such so as to permit a heat exchanger 20 to be passed downwardly into the housing.

Generally, the heat exchanger contains a number of rows of parallel tubes extending through a plurality of plate fins which are disposed in a stacked array 18 between a pair of tube sheets 22 (only one of which is shown). A plurality of return bends 21, or any other suitable connection such as cross-over tubes or the like, are joined to the ends of the tubes to establish one or more flow circuits passing through the plate fin array.

The connector joints are formed by inserting the return bends into bell-like sockets of a prescribed geometry formed in the ends of the tubes. It is convenient to assemble the connectors within a single joint region adjacent to the outside of one of the tube sheets whereby all the joints may be immersed simultaneously within the bath as illustrated in FIG. 1. When lowered into the molten bath as shown, solder penetrates the space between the return bends and the bell socket. Applying ultrasonic energy to the bath permits the energy to enter the joint regions and thus break down any unwanted oxides which normally form on the aluminum tubing service. This, in turn permits the solder to wet the joint surfaces and thus provides for the formation of a good metallurgical bond.

One of the critical steps in creating a truly reliable joint using the ultrasonic soldering technique involves holding the heat exchanger structure at a pre-determined temperature during the entire soldering process. Heretofore, the exchanger was preheated at some remote station prior to the joints being immersed in the bath. This generally required that the unit be picked up and transported from the preheat station to the bath situs. This handling and transporting of the unit caused the heat added during preheating to be dissipated into ambient air at an unpredictable and uncontrollable rate. The exchanger thus can be cooled to a point where it acts as a large, highly efficient, heat sink in regard to the tube joints. The relatively large exchanger structure will rapidly draw heat out of the comparatively smaller joint regions during the soldering operation which, of course, adversely effects the quality of the bond formed.

In the present invention, at least a portion of the plate fin section of the heat exchanger adjacent to the joint region is heated under controlled conditions while the joints are being treated in the solder bath. By applying heat to the exchanger structure during the soldering operation, the exchanger is used as a controlled heat sink in the process to limit the amount of energy that is pulled out of the joint region during the formation of the bond. Heating of the exchanger is accomplished in part by utilizing the extremely high temperature energy emanating from the bath. A control means is also provided for accurately applying ultrasonic energy to the bath once the exchanger structure reaches a pre-determined temperature.

Referring once again to FIG. 1 an air inlet duct 25 is arranged to enter the right hand side wall of the housing as illustrated. The inlet duct is operatively connected to a motor driven blower unit 26 that is arranged to direct a steady flow of air through the plate fin section 18 of the exchanger contained within the housing. A penetrable soft rubber seal 28 or any other suitable seal, is extended about the periphery of the opening 19 formed in the housing. This deformable seal is arranged to ride in contact against the surface of the plate fin section thereby minimizing the heat loss through the upper opening during the soldering operation. An exhaust duct 30 is operatively connected to the left hand side wall of the housing as illustrated in FIG. 1 which provides a flow passage for exhausting air from the interior of the housing.

The outside of the housing, as well as the outer surfaces of the inlet and outlet duct work, is covered with an insulating material 31 which serves to minimize the loss of heat energy from the interior of the housing. Accordingly, a preponderance heat rising from the bath surface is contained within the housing. In practice, the bath is generally maintained at a temperature slightly above the desired soldering temperature. Consequently, the air above the bath is heated to some temperature above ambient temperature. Actuation of the blower causes the heated air to be moved over the plate fin surfaces thus heating the structure.

A series of ribbon-type heating elements 36 extend across the interior of the inlet duct which, when actuated, adds to the heat given off by the solder bath. The actuation of the heating elements is regulated by an electrical system which includes a control unit 37 operatively connected to the ribbon heaters. A sensing element 38 is supported in the top wall of the housing. The sensor includes a heat sensitive probe (not shown) adapted to sense the temperature of the plate fin structure contained within the housing. The probe is adapted to send an electrical signal indicative of the exchanger temperature to the control unit. The control unit, in response to the sensitive signal, will actuate the heating elements when the exchanger temperature falls below a prescribed level. The heaters are deactuated when the temperature of the exchanger reaches the desired level. The control unit is also electrically connected to the transducer elements 13 and arranged to activate the elements when the exchanger is at the desired temperature.

Figure 2:
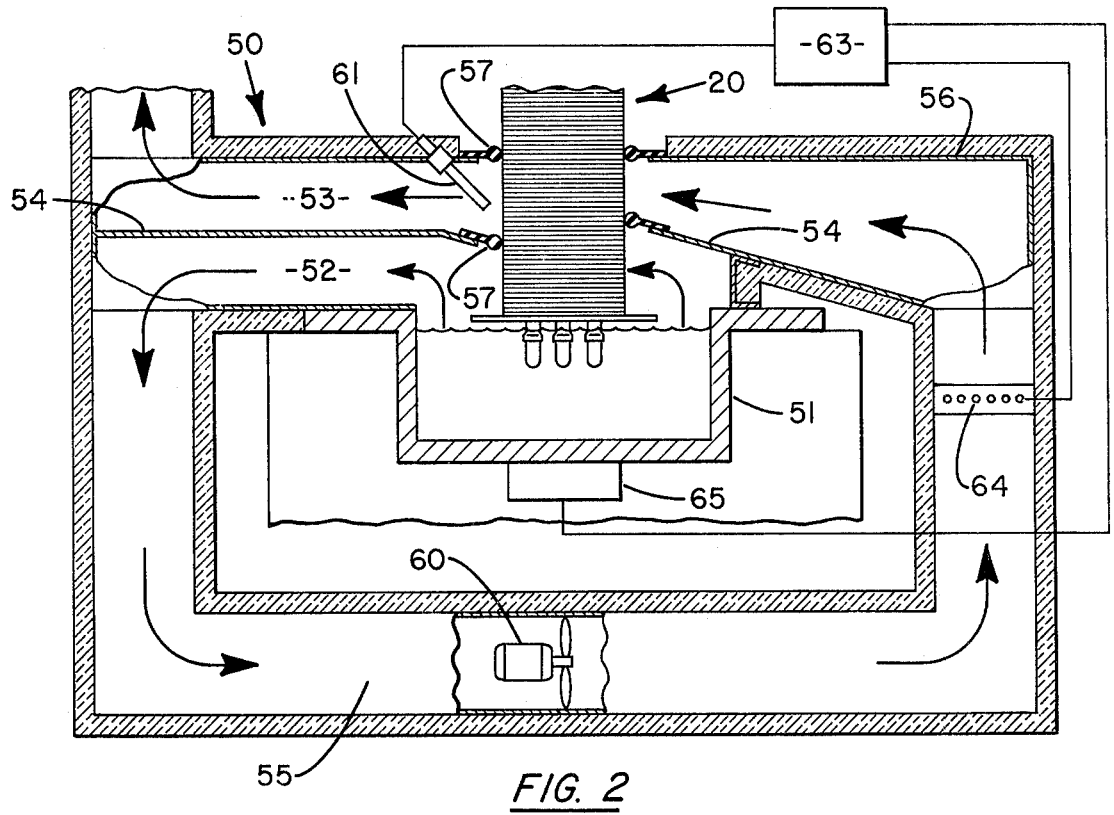
FIG. 2 is a diagrammatic illustration of a second embodiment of the present invention.

Referring now to FIG. 2, there is shown a second embodiment of the present invention. As illustrated, a housing 50 is supported over the solder pot 51 in a manner similar to that described above. The interior of the housing is partitioned into two separate horizontally extended sections, a lower section 52 and an upper section 53, by means of an internal wall 54. A return air duct 55 is arranged to pass under the solder pot so as to place the lower section 52 of the housing in fluid flow communication with the upper section 53 whereby air passing through the housing makes at least two distinct passes through the plate fin section supported therein. Both the top wall 56 and the internal wall 54 of the housing are provided with coaxially aligned openings which permit heat exchanger 20 to be passed downwardly through the housing and thereby permit the joint region of the exchanger to be submerged below the level of the bath. Seals 57 are passed around the periphery of both openings so as to minimize the exchange of air between sections and to prevent air from escaping from the housing.

A blower 60 is positioned in the return air duct 55 and arranged to draw high temperature air from the lower section of the housing and pass this air through the upper section thereof. Here again, a sensor 61 is positioned in the top wall of the housing which is adapted to sense the temperature of the heat exchanger. The sensor sends a temperature indicative signal to a control unit 63 which in turn controls the actuation of a series of ribbon-type heater elements 64 located in the return air duct. Similarly, the transducers 65 positioned below the solder pot are actuated via the control unit when the temperature of the bath reaches the desired soldering level.

While this invention has been described with reference to the structure disclosed herein, it is not necessarily confined to the details as set forth and this application is intended to cover any modifications or changes that may come within the scope of the following claims.

What is claimed is:

1. An apparatus for bonding tubular components of a plate fin heat exchanger of the type wherein the joints between the tubular components are immersed within a molten bath of solder supported within a solder pot and having transducer means operatively associated with the solder pot which, when actuated produced ultrasonic vibrations within the bath, the improvement comprising:
   a housing for substantially enclosing the solder pot whereby the solder bath is contained within the housing and means for establishing contact of air contained within the housing with the solder pot so that said air is heated by the solder bath,
   the housing having an opening in the top wall thereof for allowing a heat exchanger to be passed into the housing whereby the tubular joints of the exchanger are immersed within the solder bath,
   blower means for moving said air contained within the housing over the surface of the exchanger, and
   heating means operatively associated with the blower means for raising the temperature of the air moving over the surface of said heat exchanger.

2. The apparatus of claim 1 further including
   probe means for sensing the temperature of the heat exchanger positioned within said housing, and
   control means responsive to said probe means for regulating the heating means so as to maintain the temperature of the heat exchanger positioned within the housing at a pre-determined level.

3. The apparatus of claim 2 wherein said control means is further adapted to actuate the transducer means when the heat exchanger reaches a pre-determined temperature level.

4. The apparatus of claim 3 further including duct means for directing the heated air through said housing whereby the heated air makes more than one paths over the surface of the heat exchanger.

* * * * *